United States Patent
Nissen (10) Patent No.: US 9,355,154 B2
(45) Date of Patent: *May 31, 2016

(54) MEDIA SEQUENCING METHOD TO PROVIDE LOCATION-RELEVANT ENTERTAINMENT

(71) Applicant: Peter Neal Nissen, Arlington, VA (US)

(72) Inventor: Peter Neal Nissen, Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/676,689

(22) Filed: Apr. 1, 2015

(65) Prior Publication Data

US 2015/0269166 A1 Sep. 24, 2015

Related U.S. Application Data

(63) Continuation of application No. 12/286,859, filed on Oct. 2, 2008, now Pat. No. 9,031,939.

(60) Provisional application No. 60/997,358, filed on Oct. 3, 2007.

(51) Int. Cl.
*G06F 17/30* (2006.01)
*G06Q 30/02* (2012.01)
*H04W 4/02* (2009.01)
(Continued)

(52) U.S. Cl.
CPC ...... *G06F 17/3053* (2013.01); *G06F 17/30041* (2013.01); *G06F 17/30053* (2013.01); *G06F 17/30424* (2013.01); *G06Q 30/02* (2013.01); *H04L 61/609* (2013.01); *H04W 4/02* (2013.01); *G06F 17/3087* (2013.01); *H04L 67/18* (2013.01)

(58) Field of Classification Search
CPC .................................................. G06F 17/3087
USPC .................................. 707/724; 701/431, 468
See application file for complete search history.

(56) References Cited

U.S. PATENT DOCUMENTS 6,266,614 B1 * 7/2001 Alumbaugh ....... G01C 21/3644
701/468
6,282,489 B1 8/2001 Bellesfield et al.
(Continued)

OTHER PUBLICATIONS

Non-Final Office Action of Jul. 12, 2011 for U.S. Appl. No. 12/286,859, 12 pages.
(Continued)

*Primary Examiner* — Apu Mofiz
*Assistant Examiner* — Chelcie Daye
(74) *Attorney, Agent, or Firm* — Kilpatrick Townsend & Stockton LLP (57) ABSTRACT

Systems, methods, and computer-program products are described for determining current location information which includes determining whether an object is moving by comparing the current location information with previous location information. Future location information is calculated and a point of interest is filtered using the future location information. A media asset is then matched to the filtered point of interest and a current score is determined for the matched media asset. Determining a current score includes determining a window in which the matched media asset is geographically relevant to the future location information, and updating the matched media asset score when the future location information changes. An ordered playlist is dynamically generated according to the future location information by repeatedly prioritizing and sequencing matched media assets according to the current score for each matched media asset, and matched media assets are played or displayed in the ordered playlist.

20 Claims, 10 Drawing Sheets

(51) Int. Cl.
*H04L 29/12* (2006.01)
*H04L 29/08* (2006.01)

(56) References Cited

U.S. PATENT DOCUMENTS

| | | | |
|---|---|---|---|
| 6,446,002 B1 | 9/2002 | Barton | |
| 6,526,411 B1 | 2/2003 | Ward | |
| 6,650,288 B1* | 11/2003 | Pitt | G01S 19/05 342/357.42 |
| 9,031,939 B2 | 5/2015 | Nissen | |
| 2007/0174881 A1* | 7/2007 | Idehara | H04L 29/06027 725/90 |
| 2007/0219708 A1* | 9/2007 | Brasche | G01C 21/32 701/457 |
| 2008/0010014 A1* | 1/2008 | Hess | G01C 21/3688 701/431 |
| 2009/0044246 A1* | 2/2009 | Sheehan | H04N 21/2221 725/146 |
| 2009/0048908 A1* | 2/2009 | Kaplan | G06Q 30/02 705/7.33 |
| 2009/0094257 A1 | 4/2009 | Nissen | |

OTHER PUBLICATIONS

Non-Final Office Action of Feb. 3, 2012 for U.S. Appl. No. 12/286,859, 12 pages.
Final Office Action of Oct. 23, 2012 for U.S. Appl. No. 12/286,859, 14 pages.
Non-Final Office Action of Jun. 24, 2014 for U.S. Appl. No. 12/286,859, 11 pages.
Notice of Allowance of Jan. 9, 2015 for U.S. Appl. No. 12/286,859, 6 pages.

* cited by examiner

FIGURE 4
GEO-FILTER P: airplane variation
Distance method versus Cone of Visibility Method FIGURE 9
PLAYLIST LOOP
Detail: Prefix Selection Module

MEDIA SEQUENCING METHOD TO PROVIDE LOCATION-RELEVANT ENTERTAINMENT

CROSS-REFERENCES TO RELATED APPLICATIONS

This application is a continuation of U.S. patent application Ser. No. 12/286,859, filed Oct. 2, 2008, entitled MEDIA SEQUENCING METHOD TO PROVIDE LOCATION-RELEVANT ENTERTAINMENT, and claims the benefit of provisional application No. 60/997,358, filed Oct. 3, 2007, entitled MEDIA SEQUENCER WITH GPS TRIGGER, the contents of which are hereby incorporated by reference in their entirety.

TECHNICAL FIELD

The present invention is directed in general to provisioning entertainment and information programming that is location-relevant, and in particular, to a method for providing such programming to handheld devices, automobile navigation systems, and airplane in-flight entertainment systems.

BACKGROUND OF THE INVENTION

Methods for providing location-relevant data to location-aware devices are well-known. But the majority of such methods describe visual-only information such as text or icons on a map, and not audio or video media. Of the few methods that do concern location-triggered "rich" media such as audio or video, none of them describes ability past the simple triggering of such media when the user is near a certain point of interest. The present invention furthers the Art by creating the ability to prioritize and sequence the relevant assets into an intelligently-ordered playlist, creating the impression of a cohesive entertainment program.

This method is envisioned for devices such as iPhones, Blackberrys, smartphones, cell phones, and other devices that are location-aware, either by using GPS and/or using other location-finding methods. Another incarnation is for navigation units that reside in cars and other ground vehicles. A further incarnation is for the in-flight entertainment system of airplanes.

Location-triggered players for playing location-based content on an airplane do not exist. A market survey of the In-Flight Entertainment (IFE) managers of the major US airlines confirms that such a technology has never existed on their airplanes, nor is it known to ever have been suggested to them as an available product. However, once having heard of such a prospective product—with which passengers hear a guided tour of the landscape, incorporating music, documentary, and explanations of the places they see out the window at that very moment—interest among these service buyers is high. In this realm, the current invention is unique.

Prior Art of GPS-Triggered Audio Devices

GPS-triggered audio devices for automobiles are known. But the majority of the art concerns itself with methods for conveying traffic and weather information. In a small number of instances, it is an explicitly stated function of a technology to provide other information such as "point-of-interest" information or advertisements. In very few cases is the function to provide geo-specific "entertainment." The current state of the art, even in its incarnation most closely approximating "entertainment," is rudimentary in creating what is known among entertainment industry professionals as "entertainment value."

To wit: in even the most advanced form of the existing art, there may be long gaps between audio assets; if there is a mixture of categories (music, documentary, simple ID's), there is no thoughtful order to alternate such assets, and there may be a stream of same-category assets; there is no ability to direct the listener's gaze right or left, depending where the point-of-interest is; there is no utility to tell the listener via audio how far away the point-of-interest is; if a driver is following a historic trail, there is no utility to tell the story differently going North than going South; there is no functionality to fade down music, play a point-of-interest asset simultaneously, and fade the music back up; there is no forward-thinking algorithm that predicts the time available to a milestone ahead and chooses an asset that will fit within the time available; there is no utility to intelligently balance assets which are short (e.g. 3 seconds) with those that are long (e.g. a mini-documentary, which may last 3 minutes); or to prioritize assets that are geo-specific (e.g. identification of a town), against those that can be played anytime but should find a home in the playlist sometime (e.g. a song about a state).

The impression, therefore, is less "entertainment" and more "information," and less "tour guide" and more of a string of unconnected audio assets. The current art is able to play individual audio assets which may in themselves be entertaining But there is a need for a technology that synthesizes these assets in a manner that approximates the production value of a professional radio program.

Prior Art of GPS-Triggered Advertising

Although some existing applications are designed to play advertisements, none of them is designed with specific functionality to interweave advertisements with entertainment. Technologies designed for advertisements but not entertainment will only be effective if the user is willing to hear nothing but advertisements. However, two entire industries, television and radio, are based on the well-known successful formula of interweaving advertisements within entertainment programming. If used to its capability, the current invention can create the impression of an entertaining radio station of music, storytelling, and advertisements. If geo-relevant advertisements are part of programming that viewers are already listening to (if, for example, a song ends and then the listener hears, "I see you're approaching Exit 7—come eat at Joe's Diner"), such advertisement placement will be more attractive to advertisers than the current art can provide.

For the preceding reasons, there is a need for such a system and method, for handheld units, automobiles, and airplanes.

Prior Art of Music Scheduling

Integrating an automated scheduling component into the current invention will solve the aforementioned drawbacks. Such "playlist" programs are well-known, but have not been integrated into GPS-triggered systems. Such programs allow music programmers such as radio station managers to input rules concerning the placement and importance of songs (for example, to disallow two songs from the same artist to play within the same hour), with the result that the algorithm prioritizes assets from the music library and schedules them correctly.

BRIEF SUMMARY OF THE INVENTION

The present invention creates the impression of a well-organized and continuous radio program, by responding to location signals, whether via GPS or other method, selecting and sequencing location-relevant audio or visual assets according to a set of rules, and playing them through the existing audio or video system of the device. From the user's direction and speed, the application creates a forecast of assumed motion, plans the media program accordingly, and changes the program if the motion changes. The application filters and prioritizes assets of various lengths and with various degrees of geographic specificity, ranging from very specific such as announcement about Points of Interest (POIs) to very broad such as songs about states. POIs are announced with a notation that identifies the distance to the POI and an indication whether it is on the left or right. The audio describing relative location (prefix) is grafted to the audio describing the location (suffix) in a way that creates the impression that the narrator says it as one sentence. The assets reside on a central server and cached locally and are transmitted when needed to the vehicle as required by the user's location.

BRIEF DESCRIPTION OF THE DRAWINGS

The present invention is more readily understood from the following detailed description with reference to the accompanying drawings, and wherein.

DETAILED DESCRIPTION OF THE INVENTION

The principles of the present invention may be practiced in the following manner. While three embodiments are described herein, it should be understood that the principles of the invention as claimed are not limited by these described embodiments.

General Overview

Figure 1:
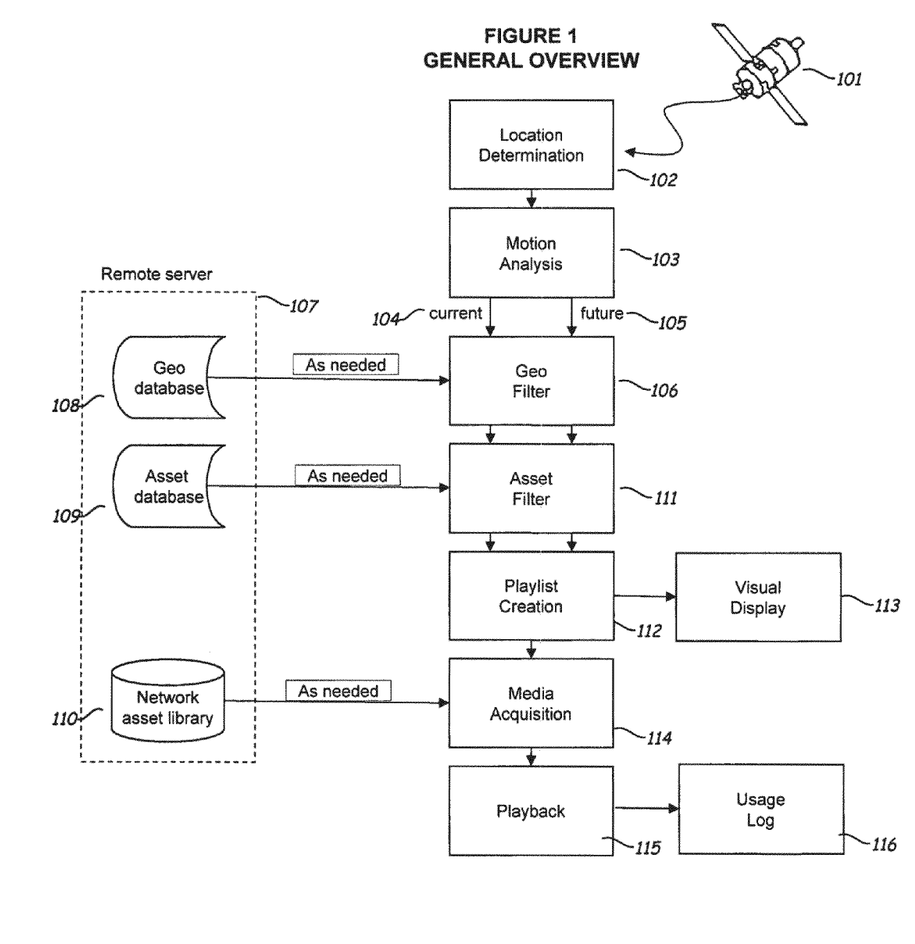
FIG. 1 depicts a General Overview.

Referring to FIG. 1, the space-borne GPS system of satellites 101 transmits GPS signals which are received by a GPS receiver in the device, and interpreted by the Location Determination Module 102. Alternately, location information is provided by other means, such as cell-phone tower triangulation. This location data is passed to the Motion Analysis module 103. By comparing with previously-received data, the Motion Analysis module determines if the user is moving. If not, it passes current location data 104 to the Geo Filter module 106. But if the user is moving, the Motion Analysis module calculates speed, direction, and future location data 105 which it also passes to the Geo Filter module.

A Geo database 108 on a remote server 107 provides a lookup array of geocoded information regarding POIs (Points of Interest) to the Geo Filter 106. More explanation as to how the Geo Filter works is given below. The networked Geo database is accessed on an as-needed basis and may be cached locally.

The Asset Database 109 on a remote server is a listing of audio and visual assets contained in the Network Asset library 110, and includes a variety of metadata associated with each asset, including which POIs may trigger the asset, class information, other criteria which will be factors in when to play the asset, and text information. The networked Asset Database is accessed on an as-needed basis and may be partially cached locally.

Data from the Asset Database is passed to the Asset Filter 111. More explanation as to how the Asset Filter works is given below.

A set of qualifying assets are passed to the Playlist Creation module 112, which creates a playlist of the next n assets which are determined best to be played in the near future, as calculated by the movement of the user. This is the heart of the invention. More description of Playlist Creation module 112 is given below.

A playlist of n assets having been selected, the playlist information is passed to the Media Acquisition module 114. If a needed asset is not cached locally, this module acquires it from the Network Asset Library 110, using any transmission means available including wireless and/or internet protocol. Assets which are expected to be used in the near future are cached, so there will be no problem with missing data in a low-bandwidth or data-blackout situation.

In Playback module 115, each asset is triggered at its assigned time. The module creates electric audio signals which are sent to the unit's or vehicle's existing AN Player for playing in speakers or headphones. In the airplane-based embodiment of the invention, the signal created by the invention may be integrated into the In-Flight Entertainment system's current channel lineup, and exist as its own channel.

The Playlist Creation module 112 may also output a visual representation of the next n assets to the unit's Visual Display 113 so users can read what to expect in the near future.

The Playback module may also output data to the Usage Log 116 to create a history of which asset was played, and when. This data is used for several purposes, such as reporting for music rights, reporting for advertising placement, and user data analysis for use in quality control.

Practical Note on Size of Media Storage

The different embodiments of the invention dictate different needs for media storage which are dictated by the quantity of POIs, as follows:

Quantity of POIs: airplanes. It is useful to calculate an ideal quantity of POIs to create an interesting, varied, and non-stop audio program. Consider the airplane embodiment. At cruising altitude, POIs such as cities can be seen comfortably up to about 30 miles away, from either side of the airplane. This creates a viewing corridor 60 miles wide. With this in mind, it is calculated that, to create a continuous program that would provide relevant content for any possible route over the 48 contiguous states of the US, there should be about 20,000 POIs identified for that area.

Cache Size: airplanes.

Audio assets will range in length from short ID's of a POI (which may last for only 5 seconds), to documentary-style features (can be any length, averaging 1 to 4 minutes), to songs (average length is 3.5 to 4 minutes). It is calculated that a varied mixture of such assets to cover 20,000 POIs would amount to about 100 hours of audio time. With current MP3 compression, this requires about 6 gigabytes of storage space. It is not unreasonable to load this entire media library onto the system of an aircraft's IFE avionics or onto a removable storage device. Therefore, little asset refreshment is necessary except for updates, which may occur, for example, weekly.

However, the handheld and automotive embodiment requires a different storage proposition, with more frequent updates.

Quantity of POIs: handheld units and car navigation units. It is envisioned that the program will be used to provide GPS-based entertainment wherever people or automobiles may go, and that the entertainment content and advertiser content will be dynamically updatable. Therefore, the size of the asset library is theoretically unlimited, and the media acquisition capabilities must be on-demand. One way of accomplishing this, for example, is to have the unit download all relevant assets within a range of a few miles.

Geo-Filter Module

Figure 2:
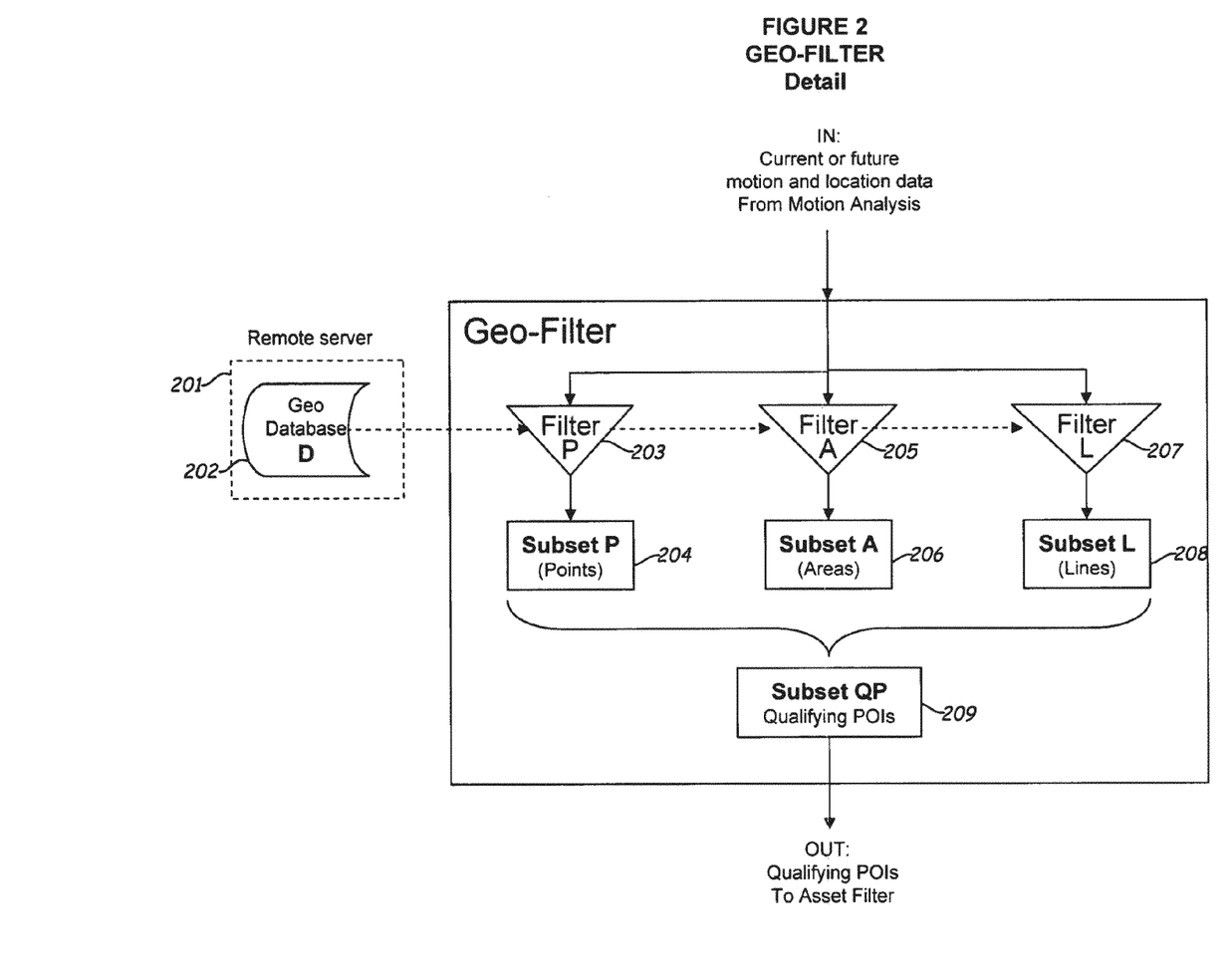
FIG. 2 depicts the method of the Geo Filter.

Referring to FIG. 2, we can understand how the Geo Filter Module works.

The administrator of the program creates a large GeoDatabase 202, referred to as D, which resides on remote server 201. In the airplane embodiment of the invention, D may be, for example, a list of 20,000 points, representing cities, mountains, and other visible points of interest across the United States. Each record in the list contains a POI name and latitude and longitude.

The first step in the process is to reduce D to a subset of qualifying POIs QP (209), based on location information provided by the Motion Analysis module. QP represents every possible POI which is relevant at a given position.

There are three filters to select these POIs: Filter P (203), Filter A (205), and Filter L (207), which select Points, Areas, and Lines, respectively. The reason for three filters is that the mathematical calculation of proximity is different for each shape of POI. More detail about the methods of each filter is given below. The results of these filters are Subset P (204), Subset A (206), and Subset L (208). Together, these constitute the total subset of qualifying POIs QP (209).

Filter P Conceptual Basis

Figure 3:
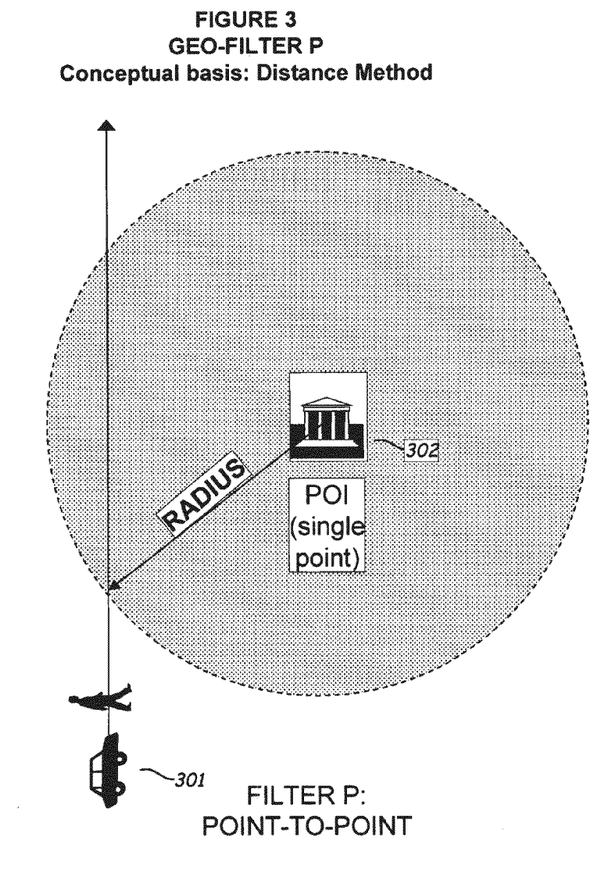
FIG. 3 depicts the conceptual basis of Geo-Filter P.

Referring to FIG. 3, we can understand the conceptual basis for Filter P, which selects qualifying points.

For the handheld and car embodiments of the system 301, a point 302 qualifies by a simple point-to-point distance calculation, so that any point within, for example, a radius 500 feet should qualify.

Distance Method Versus Cone of Visibility

Figure 4:
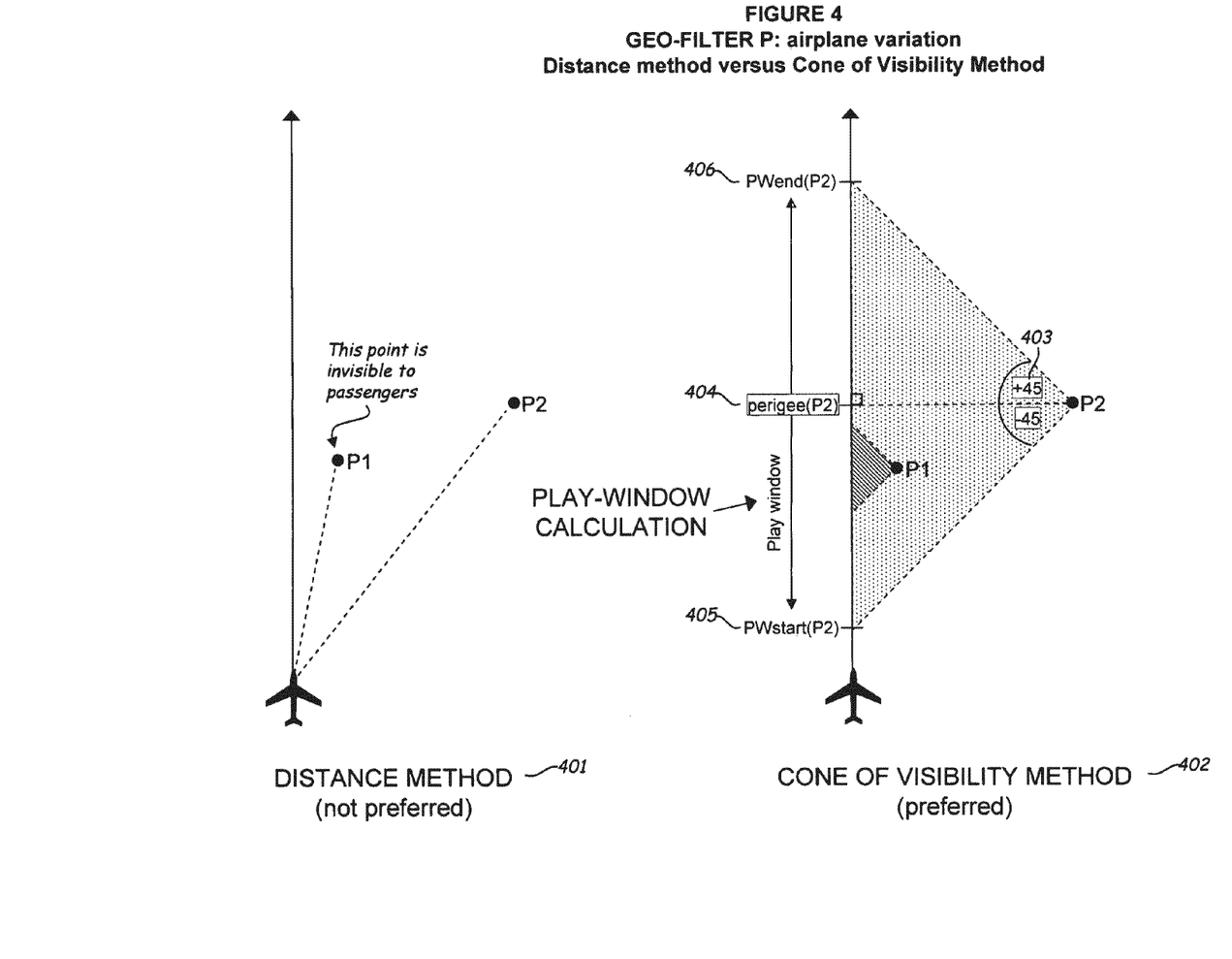
FIG. 4 depicts the conceptual bases of Geo-Filters A and L.

However, referring to FIG. 4, it can be seen that in the airplane embodiment of the invention, the distance method has a drawback.

Consider, in Distance Method 401, points P1 and P2. P1 is closer to the airplane than P2. However, because it is almost directly in front of the airplane, it cannot be seen by the passengers out of their windows. If the invention's goal is to identify points that can be seen out the window, P1 should not qualify with the airplane at its current position. But P2, which is at a more advantageous angle, should qualify.

The Cone of Visibility Method 402 fixes this problem. Using geometric calculations, it ensures that qualifying points fall within a visible cone to the right or left of the airplane.

Consider point P2 in this method. From point P2, a line is calculated at right angles to the airplane's route. The intersection of these lines is perigee(P2) (404), which by definition is the closest location the airplane will ever get to P2. Two more lines are calculated, at plus and minus 45 degrees divergent (403) from the line from P2 to perigee(P2). The points at which these lines intersect the airplane's route represent the beginning and end of the "Play Window" for that particular point, called PWstart(P2) (405) and PWend(P2) (406). The point P2 qualifies only if the airplane is within this Play Window.

The practical implications of this are that points that are further away from the airplane's route (such as P2) have a larger Play Window, and hence there is more flexibility as to when they may be played. Points that are closer to the airplane's route (such as P1) have a smaller Play Window, and the timing for these points is more critical.

The result of this method is that points do not qualify unless (weather conditions and daylight permitting) they are actually comfortably visible out of the windows of the airplane, in a cone that extends 45 degrees forward and 45 degrees backward.

If points qualify under filter P, they can be added to Subset P: the set of eligible point-shaped POIs 204.

Filters A & L—Conceptual Basis

Figure 5:
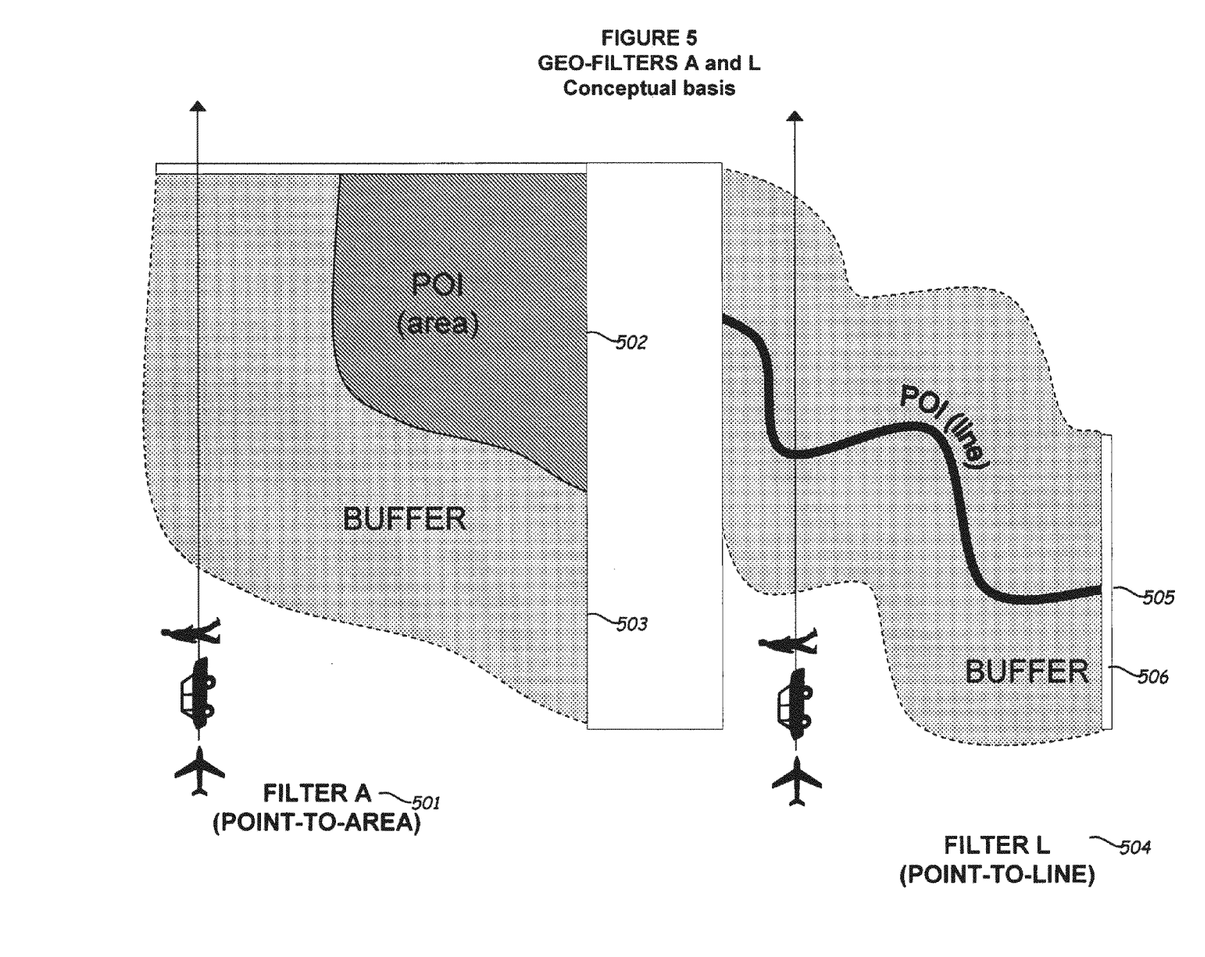
FIG. 5 depicts the method of the Asset Filter.

Referring to FIG. 5, we can understand the conceptual bases for Filter A, which selects qualifying areas 501, and Filter L, which selects qualifying lines 504. The filters are applicable in all embodiments of the invention.

POIs that are areas 502, commonly referred to in the mapping field as polygons, include items such as lakes, state parks, and states. The test determines if the user is in or above any portion of such an area, or if it is within visible distance. The filter geometrically calculates a buffer 503 of width N. If the user is within this buffer, or in or above the POI itself, the area-shaped POI is (weather conditions and daylight permitting) considered to be visible, and hence in contention.

POIs that are lines 505, commonly referred to in the mapping field as polylines, include straight and non-straight items such as rivers, highways, and geographic borders. The filter geometrically calculates a buffer 506 of width N. If the user is within this buffer, the line-shaped POI is (weather conditions and daylight permitting) considered to be visible, and hence in contention.

Asset Filter

Figure 6:
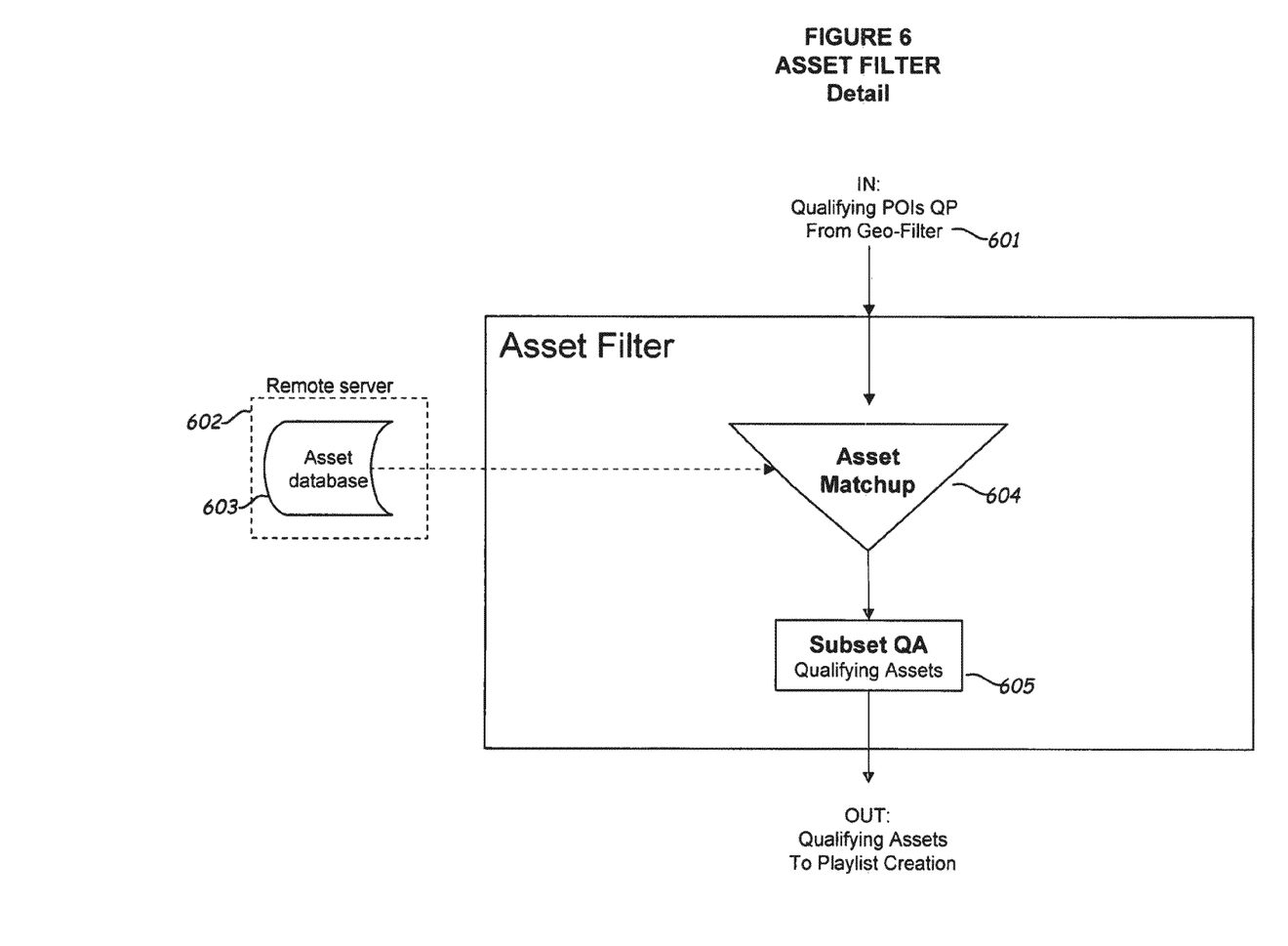
FIG. 6 depicts the method of the Playlist Creation module.

Referring to FIG. 6, now that we know where we are and what POIs we are near, we must check to see if there are media assets available that are relevant to the POI.

Media assets vary in length and variety. In the first incarnation of the program it is assumed that most will be MP3 audio files. One example may be 2 seconds in length, consisting of a narrator saying the words, "The East River." Another example may be a 2-minute long mini-documentary explaining crop irrigation circles. Other media assets will be songs, which usually average 3.5 minutes in length.

The Asset Filter module considers: for each point in subset QP (601), is there an asset in the asset database 603? There may be no asset available specifically for a given POI, but there may frequently be a selection of assets more generally relevant to that POI. For example, if the POI is the state of Texas, there are many songs about the state, all of which are eligible to be played.

The Asset Matchup accesses the Asset database 602 on the remote server 601, performs a matchup 604 to see which assets qualify to be played given for any of the qualifying POIs in subset QP (601). The filter creates Subset QA (605), which is a list of all assets which may be played for any or all of the qualifying POIs. This list is passed to the Playlist Creation Module.

Playlist Creation Module

Figure 7:
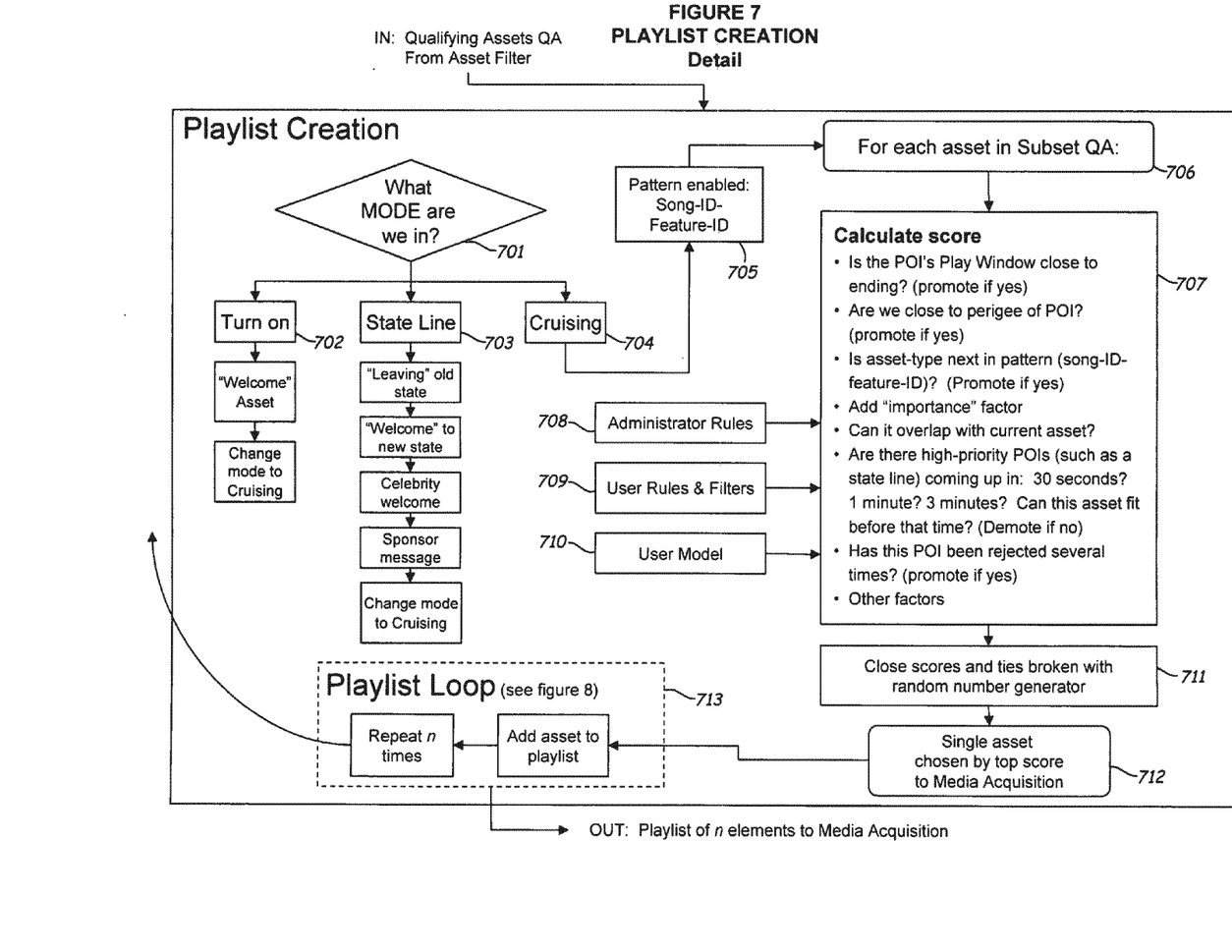
FIG. 7 depicts Play-window Calculation and the Cone of Visibility method of the Playlist Creation module.

Referring to FIG. 7, we can understand the method of the Playlist Creation Module, which chooses a single asset from the subset of all qualifying assets, Subset QA, and then iterates the process to create a playlist of several sequential assets.

By referring back to FIG. 1, we are reminded of the difference between POIs and assets. Whereas "POIs" are geographic Points of Interest, "Assets" are pieces of media such as short MP3s, which are relevant to certain POIs. The Playlist Creation Module is concerned with prioritizing not the subset of POIs Subset QP, but that of Assets, Subset QA.

The program first determines the current mode 701. Depending on the mode, different rules apply. If the mode is "Turn on" 702, the program will choose a "Welcome" asset before changing the mode to "Cruising" 704. This creates a pleasing introduction to the program as the unit is turned on, or as the airplane takes off. If the mode is "State Line" 703, the program will execute a script of assets. For example, first, the narrator will notify us that we are leaving the old state. Then we will be welcomed to the new state. Then, a celebrity from that state will greet us, and then a sponsor will have a message. After that, the mode is changed to cruising 704, and there is much more freedom for the program to choose assets. There may be other specialized modes; these are only given as examples of how modes affect playlist selection.

Cruising Mode 704

This is the main mode of the program. For the sake of variety, there is a pattern 705 which the program is designed to follow: song-ID-Feature-10. This is an underlying but breakable rule, which creates a pleasing experience so that, for example, songs are not back-to-hack, but alternate with smaller assets such as IDs.

The program tests each asset in Subset QA 706, and assigns each a score 707. At this point, the program is similar to a radio playlist scheduler. There are many factors involved in calculating the score of an asset, including, as shown:

- Is the POI's Play Window close to ending? If "yes", the score is promoted, because "chances are running out" to play the asset.
- Are we close to the perigee of the POI? If yes, the score is promoted. The ideal spot for playing an asset is when the user is at the perigee, or slightly before.
- Is the asset-type the next one in the pattern (song-ID-feature-ID)? If so, the score is promoted. The scoring system allows for the pattern to be imposed, but not as an iron-clad rule, as other factors may overrule the pattern.
- Add "importance" factor. Some assets may, in the opinion of the Administrator, be simply more important to play than others. This factor would be a piece of metadata attached to the asset. If, for example, the Chicago Cubs were to win the World Series, the asset declaring this news would be assigned a high "importance" factor, so the asset is virtually certain to be played when the airplane is within range of that area.
- Can it overlap with current asset? One capability of the program is to fade down a song, play an ID, and fade the song back up. Therefore, two assets must be able to be played at the same time. If the current asset is a song, other assets may play at the same time, provided that the song is currently within a "Window of Opportunity" (a television-programming term also known as "WOO"), which is a pre-defined section where other assets may be overlapped over it.
- Are there high-priority POIs (such as a state line) coming up in: 30 seconds? 1 minute? 3 minutes? Can this asset fit before that time? This step allows the program to "squeeze in" assets as appropriate.
- Has this POI been rejected several times? (promote if yes). This step ensures that low-priority assets eventually "get their chance" and are not always outranked by higher-priority assets. If the low-priority assets have been in contention for a long time, their score will gradually increase until they are high enough for playing.
- Other factors to be determined. The invention's overall design may be refined upon implementation, but this module in particular will continue to benefit from improvements informed by use.

The program includes a setup utility which allows the Administrator to impose and change custom rules 708. For example, the Administrator is able to change the relative importance of each factor discussed above.

The program also includes the capability to integrate User Rules & Filters 709. Method of input vary from device to device, but it can be, for example, via a selection of choices shown on a touch-screen. Some users may be interested in sports-related assets, so the program would be weighted and/or filtered for such assets. Other user preferences may include, for example: kids' version, documentary-only, music-only, no overlapping over music, and Spanish-language.

The program will also integrate a User Model 710, in which preferences are stored.

Once the scores are calculated for all eligible assets, there may be ties or close scores. A random number generator 711 helps choose among these scores. For example, for any given state there may be several songs which generate exactly the same score, as the Administrator has no reason to prioritize one above the other. This creates variety for users who often travel the same route, so they will not always hear the same sequence of assets.

A single asset is chosen by the top score 712, and added to the playlist.

The Playlist module then is iterated a number of times n in a loop 713, to generate a complete playlist for output to the Media Acquisition module.

Iteration

Figure 8:
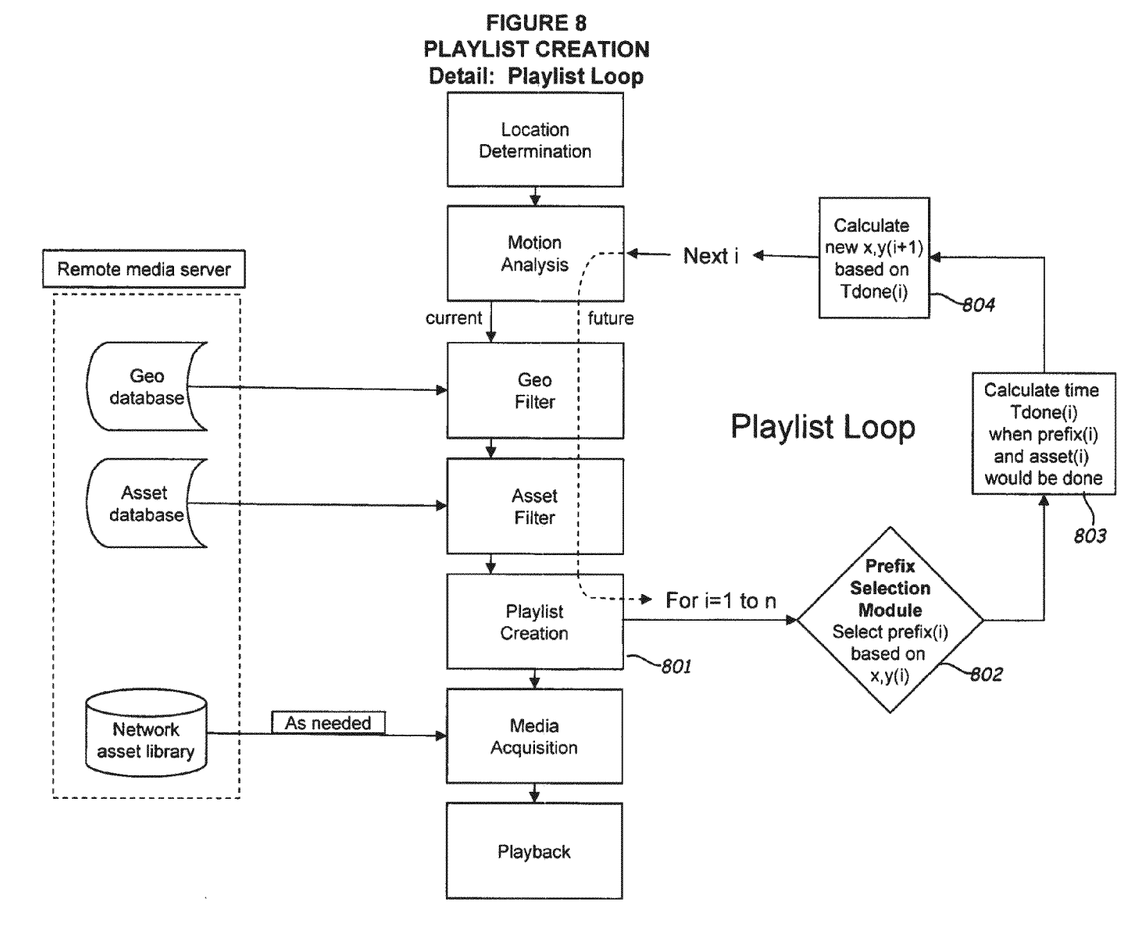
FIG. 8 depicts the Playlist Creation loop.

Referring to FIG. 8, we can understand the method of the Playlist Loop. The Playlist Creation module 801 considers a finite number of slots n, in which are listed the next assets that are predicted to be relevant considering the user's motion. In practice, a reasonable value for n may be 5.

Once an ideal asset is selected, it is processed by the Prefix Selection Module 802, which determines if the asset needs a prefix such as "12 miles away on our left . . . ". More information on the Prefix Selection Module is given below.

The program must then look forward to determine the next assets: when they will play, and where the vehicle will be when they are played. The program calculates 803 time Tdone(n) when prefix(i) and asset(i) would be done. It then calculates 804 the position (x,y) where the user will be when the assets are finished playing, based upon the assumption that the user will continue in the same speed and direction. With this forecasted position data, the program can repeat the selection process. The loop repeats n times, thereby loading up n slots of asset selections into the future. This information will be passed to the Player module for triggering at the appropriate time. The information can also be passed to a playlist display.

The Playlist Module need not run continuously, and in fact, should not, to conserve CPU activity. It may be adequate for the loop to be executed once every 15 seconds, to make sure that the user's position, bearing and speed are correctly calculated, and the playlist can be updated or corrected accordingly.

Prefix Selection Module

Figure 9:
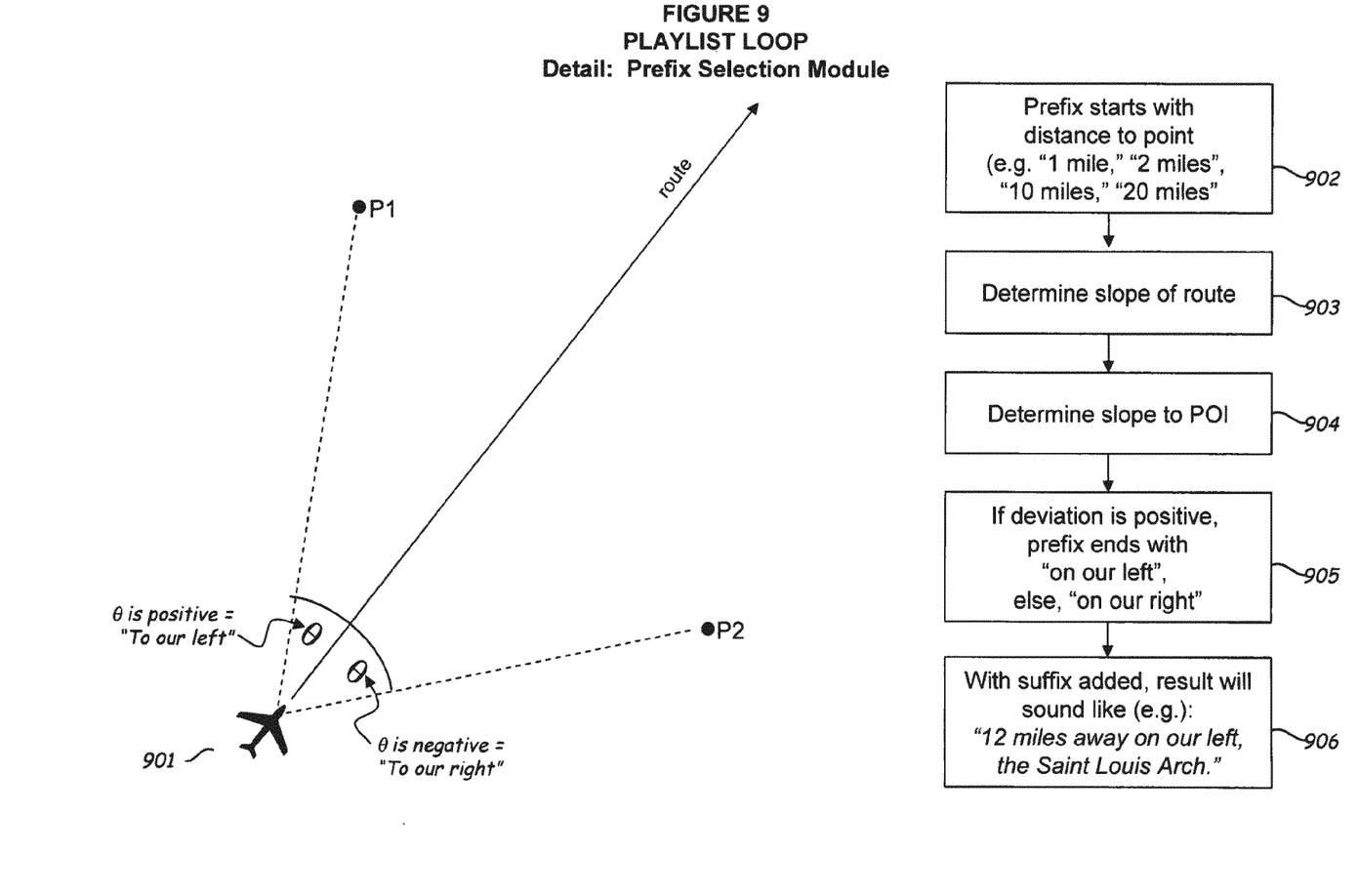
FIG. 9 depicts the Prefix Selection Module of the Playlist loop.

Referring to FIG. 9, we can understand the method of the Prefix Selection Module, which chooses a spoken audio "prefix" asset such as "10 miles to our right." The prefix is composed of two elements: distance and "left/right".

Consider an airplane 901, traveling along a predictable route.

Distance to points P1 and P2 (902) are easily calculable through geometric formulae. The program rounds the distance figure to the closest match within the spoken assets, whether it be "1 mile," "5 miles" or "10 miles."

Then, to determine if a POI is to the "right" or "left" in relation to the route of the vehicle, the program starts by determining the slope of the airplane's route (903). The word "slope" is used in the geometric sense, and describes the angle at which the airplane is traveling across the latitude/longitude grid.

Then, the program determines the slope from the airplane to the POI (904). The two slopes are compared, creating a deviation measured as angle theta. If this angle is positive as with P1 in the illustration, then the POI is to the left. If it is negative, as with P2, it is to the right. The asset is chosen accordingly (905). The "suffix" is the asset in which the actual name of the POI is spoken, such as, "Saint Louis Arch." When the chosen prefix is followed by the chosen suffix, the result (906) will sound like, "12 miles on our left, the Saint Louis Arch."

Playback

Figure 10:
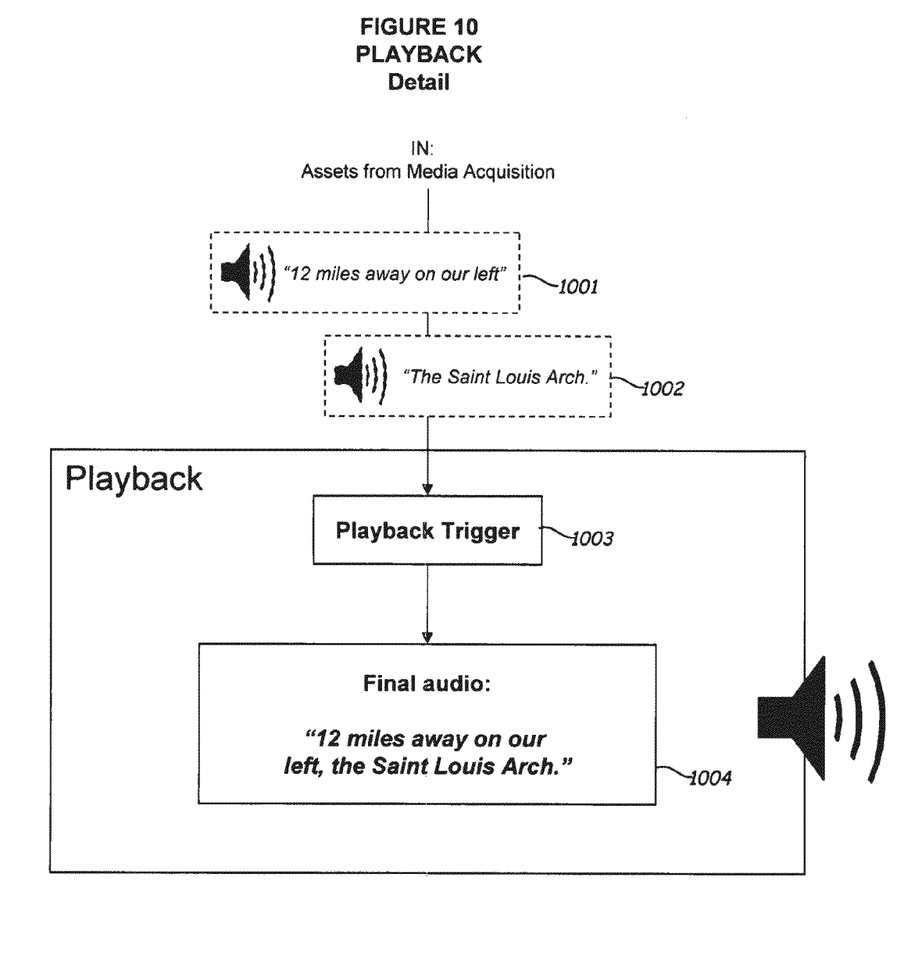
FIG. 10 depicts the Playback Module.

Referring to FIG. 10, we can understand the method of the Playback module. At the assigned moment, assets are sent from the Media Acquisition module to the Playback module, where they are made to play by the device.

If the asset 1002 includes a prefix 1001, the prefix is first triggered 1003, and then immediately upon finishing, the main asset is triggered. If the vocal recording is executed correctly, this creates the impression of a single sentence 1004.

The Media Player also "mixes" the sound, occasionally playing two assets at once, such as in the case of background music and foreground narration, and adjusts sound levels accordingly.

The foregoing describes a method for provisioning entertainment and information programming that is location-relevant, and in particular, to a method for providing such programming to handheld devices, automobiles and airplanes. Persons of ordinary skill in the art may make several modifications to the disclosed embodiments without significantly departing from the spirit and scope of the inventive principles. All such modifications or rearrangements should be understood to be within the scope of the claims appended.

What is claimed is:

1. A computer-implemented method, comprising:
   determining current location information;
   determining whether an object is moving, wherein determining includes comparing the current location information with previous location information;
   calculating future location information;
   filtering, on a computing device, a point of interest using the future location information;
   matching a media asset to the filtered point of interest;
   determining a current score for the matched media asset, wherein determining a current score includes determining a window in which the matched media asset is geographically relevant to the future location information, and wherein determining a current score includes updating the matched media asset score when the future location information changes;
   dynamically generating an ordered playlist according to the future location information, wherein dynamically generating an ordered playlist includes repeatedly prioritizing and sequencing matched media assets according to the current score for each matched media asset; and
   playing or displaying matched media assets in the ordered playlist.

2. The method of claim 1, wherein determining current location information includes calculating a buffer that corresponds to the current location information.

3. The method of claim 1, wherein filtering includes using the future location information to determine an area of visibility.

4. The method of claim 1, wherein filtering includes determining an area of visibility using a calculation.

5. The method of claim 1, wherein filtering includes calculating a buffer.

6. The method of claim 1, further comprising:
   applying a predetermined preference to the matched media asset.

7. The method of claim 1, further comprising:
   periodically receiving updated location information;
   determining whether the object is moving; and
   calculating updated future location information when the object is moving.

8. The method of claim 1, wherein the ordered playlist is displayed.

9. The method of claim 1, wherein matched media assets are concurrently playable or displayable.

10. The method of claim 1, wherein played or displayed matched media assets are recorded.

11. A computer-implemented system, comprising:
    one or more processors;
    one or more non-transitory computer-readable storage mediums containing instructions configured to cause the one or more processors to perform operations including:
    determining current location information;
    determining whether an object is moving, wherein determining includes comparing the current location information with previous location information;
    calculating future location information;
    filtering a point of interest using the future location information;
    matching a media asset to the filtered point of interest;
    determining a current score for the matched media asset, wherein determining a current score includes determining a window in which the matched media asset is geographically relevant to the future location information, and wherein determining a current score includes updating the matched media asset score when the future location information changes;
    dynamically generating an ordered playlist according to the future location information, wherein dynamically generating an ordered playlist includes repeatedly prioritizing and sequencing matched media assets according to the current score for each matched media asset; and
    playing or displaying matched media assets in the ordered playlist.

12. The system of claim 11, wherein determining current location information includes calculating a buffer that corresponds to the current location information.

13. The system of claim 11, wherein filtering includes determining an area of visibility using a calculation.

14. The system of claim 11, wherein filtering includes using the future location information to determine an area of visibility.

15. The system of claim 11, wherein filtering includes calculating a buffer.

16. The system of claim 11, further comprising instructions configured to cause the one or more processors to perform operations including:
    applying a predetermined preference to the matched media asset.

17. The system of claim 11, further comprising instructions configured to cause the one or more processors to perform operations including:
    periodically receiving updated location information;
    determining whether the object is moving; and calculating updated future location information when the object is moving.

18. The system of claim 11, wherein the ordered playlist is displayed.

19. The system of claim 11, wherein matched media assets are concurrently playable or displayable.

20. The system of claim 11, wherein played or displayed matched media assets are recorded.

* * * * *